2,838,412

STABILIZED VARNISHES CONTAINING AZO-DYES AND PROCESS OF MAKING THEM

Raymond E. Werner and Theodore A. Langstroth, Cincinnati, Ohio, assignors to Sterling Drug Inc., New York, N. Y., a corporation of Delaware No Drawing. Application July 29, 1957
Serial No. 674,624

6 Claims. (Cl. 106—228)

This invention relates to varnishes containing nitrophenylazo pigments stabilized against discoloration effects caused by certain metals in the presence of small amounts of water and processes of making them.

The nitrophenylazo pigments are highly useful synthetic organic coloring matters many of which are of particular value in preparing pigment-oil coating compositions. These pigments are obtained by diazotizing a nitroaniline and coupling with the conventional naphthol and active methylene coupling components, such as 2-naphthol, 3-hydroxy-2-naphthoic arylamides, and acetoacetic arylamides (e. g., see "The Chemistry of Synthetic Dyes and Pigments," edited by H. A. Lubs, Reinhold Publishing Corp., of New York, N. Y., 1955, pages 632 et seq.). One of the problems frequently encountered in the storage and shipping of coating compositions containing the nitrophenylazo pigments is undesirable discoloration on contact with the unprotected surface of the iron drums and other containers ordinarily employed. Tin containers give the same difficulty. In use in formulating paint, these pigment compositions are diluted with approximately 9 parts of a vehicle. After the dilution the discoloration is still a problem. Ordinarily, the discoloration involved is a darkening effect and the coating composition may become nearly black, so the usefulness and commercial value of the composition is either substantially diminished or lost entirely. It has been determined that this discoloration results from the combined action of the iron and water, even when the latter is present in the small amounts, e. g., on the order of 0.01 to 2 percent by weight, which are left in the coating composition or in its varnish or pigment components after ordinary drying procedures.

We have now discovered that pigmented coating compositions of the above-described type can be stabilized against discoloration by contact with iron in the presence of small amounts of water by adding a small amount of benzotriazole. The new pigmented coating compositions provided by our invention thus comprise a varnish, a nitrophenylazo pigment, and a small proportion by weight of benzotriazole.

While there are no sharply defined limits to the proportion of the benzotriazole in the pigmented coating composition, we have found that, for practical purposes, at least about 0.005 percent by weight of the benzotriazole should be used. Amounts of benzotriazole above 0.2% do not ordinarily produce any advantage over the use of the preferred range of 0.005–0.2%, so for the purposes of economy we ordinarily do not use larger amounts. Moreover, the larger amounts, i. e. greater than 0.2%, of benzotriazole may interfere with drying in the case of certain vehicles. In concentrated coating compositions which are to be diluted with an additional quantity of vehicle, it is preferred to use sufficient benzotriazole so that the final coating composition contains at least 0.005% by weight of benzotriazole. Thus, for example, when a 9:1 dilution is to be made, we employ 0.05–0.1% of benzotriazole in the concentrated composition. In accordance with our invention, at any stage during or after the formulation of the pigmented coating composition the benzotriazole is added and uniformly dispersed or dissolved therein by any suitable means. Thus, for instance, the benzotriazole can be added to the varnish in the case of dry color grinds, or to the nitrophenylazo pigment and varnish after the conventional flushing or grinding procedure to produce the pigmented coating composition in a paste or liquid form. Ordinarily, we prefer to add the benzotriazole after the flushing procedure or after the grinding of the pigment into the varnish.

Our invention is particularly useful in providing stabilized pigmented coating compositions containing the pigments obtained by coupling 2-naphthol and a diazotized nitroaniline, such as diazotized p-nitroaniline, 2-nitro-4-methylaniline, 2-chloro-4-nitroaniline, 4-chloro-2-nitroaniline, and 2,4-dinitro-aniline to produce, respectively, the commercially important pigments Para Red, Toluidine Red R, Fire Red, Red Toner, and Permatone Orange. Other representative nitrophenylazo pigments with which the practice of our invention is useful include: the Hansa Yellows G, GR, 3G, 5G, and 10G; the Permanent Bordeaux FRR and F3R; and the Permanent Reds F3R and F4R extra.

The varnish components of our new compositions are the resin-in-solvent varnishes and bodied linseed oil varnishes conventionally employed in the coating art. Typical of the resin-in-solvent type of varnishes are an alkyd resin in a liquid hydrocarbon, an alpha,beta-unsaturated polybasic acid-modified rosin in a glycol, and a butylated melamine-formaldehyde resin in a butanol-xylene mixture.

Our invention is illustrated by the following examples without, however, being limited thereto. The parts are by weight and the percentages of benzotriazole are by weight of the pigmented coating compositions. These are concentrated compositions prepared for eventual dilution with nine parts by weight of vehicle, so that the percentage of benzotriazole in the diluted composition is one-tenth that in the concentrate.

Example 1

450 parts of pigment (dry basis) as a water-wet presscake were mixed in a dough mixer with 320 parts of linseed oil-modified phthalicalkyd resin varnish consisting of 128 parts of the resin [Syntex 3151 (80% solids, 20% mineral spirits)] and 192 parts of mineral spirits (Amsco F, boiling range 174–210° C.) until the water was flushed from the organic phase. This required about thirty minutes to one hour. The water layer was poured off and discarded. 225 parts of the pigment (dry basis) as presscake and 320 parts of the varnish were added. Mixing was continued, the water layer which formed being poured off and discarded. Then another 225 parts of the pigment (dry basis) as presscake and 385 parts of the varnish were added, and mixing and water separation were carried out as before. After completion of this flushing operation, 110 parts of the varnish were added and the composition was dried at 55° C. under reduced pressure (27 inches of mercury) for two to three hours. A small quantity of benzotriazole was mixed thoroughly with the composition. The resulting pigmented coating composition was reduced to desired strength by addition of 400–600 parts of mineral spirits (boiling range 174–210° C.).

Proceeding in the manner described above, there were prepared the following stabilized pigmented coating compositions I, II, III, IV, V, and VI.

| Coating Composition | Pigment | Benzotriazole, Percentage by Weight |
|---|---|---|
| I | Toluidine Red R | 0.05 |
| II | ----do---- | 0.1 |
| III | Hansa Yellow G | 0.1 |
| IV | Para Red | 0.1 |
| V | Red Toner | 0.1 |
| VI | Toluidine Maroon | 0.1 |

*Example 2*

Using a flushing procedure similar to that described in Example 1 above, the following ingredients were employed in the total amounts indicated: 400 parts of pigment; 435 parts of a varnish which was a mixture of 57 parts of maleic-modified rosin ester (Lewisol 28) and 43 parts of mineral spirits (Amsco F, boiling range 174–210° C.); and a small amount of benzotriazole. Proceeding in the foregoing manner, there were prepared the stabilized pigmented coating compositions VII, VIII, and IX indicated below.

| Coating Composition | Pigment | Benzotriazole, Percentage by Weight |
|---|---|---|
| VII | Toluidine Red | 0.1 |
| VIII | Para Red | 0.1 |
| IX | Red Toner | 0.1 |

*Example 3*

Using a flushing procedure similar to that described in Example 1 above, a pigmented coating composition was prepared which consisted of: 500 parts of pigment; 300 parts of a petroleum hydrocarbon fraction of boiling range 150–210° C.; 500 parts of a varnish which was a mixture of 45 parts of rosin ester (Ester Gum C), 44.5 parts of No. 5 aged oil (linseed oil which had been heat-polymerized to a viscosity reading one-half bubble high to a Z6 on the Gardner Viscosity Scale and having a value of 15–16 on the Gardner Color Scale), and 10.5 parts of No. 3 Pale Varnish (alkali-refined linseed oil which had been heat-polymerized to a viscosity of one-eighth bubble high to a Z1 on the Gardner Viscosity Scale and having a value of 5–6 on the Gardner Color Scale); and a small quantity of benzotriazole. Proceeding in the foregoing manner, there were prepared the stabilized pigmented coating compositions X, XI, and XII indicated below.

| Coating Composition | Pigment | Benzotriazole, Percentage by Weight |
|---|---|---|
| X | Toluidine Red | 0.1 |
| XI | Para Red | 0.1 |
| XII | Red Toner | 0.1 |

*Example 4*

A pigmented coating composition was prepared which consisted of: 500 parts of pigment; 500 parts of No. 1 Regular Varnish (aged linseed oil which had been heat-polymerized to a viscosity of approximately 22 poises at 25° C., having an acid number 11–17 and a color value of 15–17 on the Gardner Color Scale); and a small quantity of benzotriazole. Proceeding in the foregoing manner, there were prepared the stabilized pigmented coating compositions XIII, XIV, and XV indicated below.

| Coating Composition | Pigment | Benzotriazole, Percentage by Weight |
|---|---|---|
| XIII | Toluidine Red | 0.1 |
| XIV | Red Toner | 0.1 |
| XV | Para Red | 0.1 |

*Example 5*

500 parts of pigment were air-dried at 60° C. for about 24 hours and then pulverized. The pigment and 500 parts of No. 1 Regular Varnish were ground together on a three-roller ink mill. During the grinding operation, a small quantity of benzotriazole was added to the mixture in the proportions noted below to form the stabilized pigmented coating compositions XVI, XVII, and XVIII.

| Coating Composition | Pigment | Benzotriazole, Percentage by Weight |
|---|---|---|
| XVI | Toluidine Red | 0.1 |
| XVII | Para Red | 0.1 |
| XVIII | Red Toner | 0.1 |

The stabilized pigmented coating compositions I–XVIII obtained as described in the foregoing examples and also the diluted composition obtained therefrom remain free from discoloration when stored in contact with iron; in sharp contrast therewith, control coating compositions otherwise corresponding in composition to these stabilized compositions but containing no benzotriazole, darken undesirably, in many instances markedly so, after several days turning almost black in contact with iron. The stabilized coating compositions prepared in the manner of the foregoing examples remain free from discoloration also when stored in contact with tin.

We claim:

1. A composition containing a varnish and a nitrophenylazo pigment and including: benzotriazole, whereby the composition is stabilized against discoloration by contact with iron in the presence of small amounts of water.

2. A pigmented coating composition comprising: a varnish; a nitrophenylazo pigment; and 0.005–0.2 percent by weight of benzotriazole to stabilize said composition against discoloration by contact with iron in the presence of small amounts of water.

3. A pigmented coating composition comprising: a varnish; Toluidine Red R; and a small proportion by weight of benzotriazole to stabilize said composition against discoloration by contact with iron in the presence of small amounts of water.

4. The method for stabilizing a pigmented coating composition comprising a varnish and a nitrophenylazo pigment against discoloration by contact with iron in the presence of small amounts of water which comprises: adding to said composition a small proportion by weight of benzotriazole.

5. The method for stabilizing a pigmented coating composition comprising a varnish and a nitrophenylazo pigment against discoloration by contact with iron in the presence of small amounts of water which comprises: adding to said composition 0.005–0.2 percent by weight of benzotriazole.

6. The method for stabilizing a pigmented coating composition comprising a varnish and Toluidine Red R against discoloration by contact with iron in the presence of small amounts of water which comprises: adding to said composition 0.005–0.2 percent by weight of benzotriazole.

No references cited.